(Model.)
C. B. ISBESTER.
DEVICE FOR FORMING BEADS IN SAND MOLDS.
No. 368,719. Patented Aug. 23, 1887.
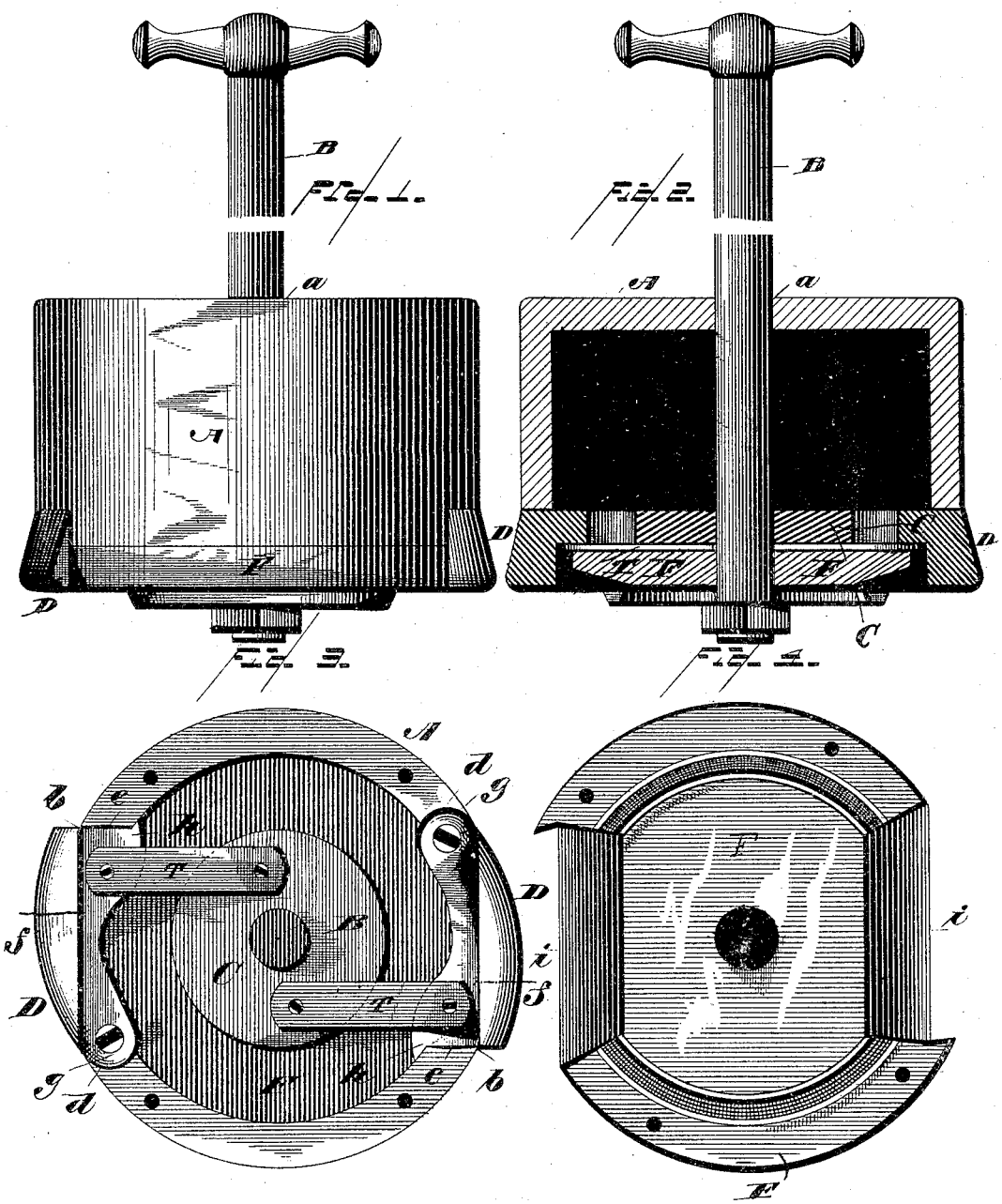
WITNESSES
O. H. Ashwell
T. Ed. Turpin
INVENTOR
C. B. Isbester
by James J. Sheehy,
Attorney

United States Patent Office.

CALEB B. ISBESTER, OF CHATTANOOGA, TENNESSEE.

DEVICE FOR FORMING BEADS IN SAND MOLDS.

SPECIFICATION forming part of Letters Patent No. 368,719, dated August 23, 1887.

Application filed June 21, 1887. Serial No. 242,002. (Model.)

*To all whom it may concern:*

Be it known that I, CALEB B. ISBESTER, a citizen of the United States, residing at Chattanooga, in the county of Hamilton and State of Tennessee, have invented certain new and useful Improvements in Devices for Forming Beads in Sand Molds; and I do declare the following to be a full, clear, and exact description of the invention, such as will enable others skilled in the art to which it appertains to make and use the same.

This invention has relation to devices for forming female beads in sand molds, and is designed as an improvement upon the patent granted to me June 29, 1886, No. 344,657.

The invention will be fully understood from the following description and claims, when taken in connection with the accompanying drawings, in which—
Figure 1 is a side elevation of my improved bead-forming device. Fig. 2 is a vertical sectional view of the same. Fig. 3 is an inverted plan view with the bottom covering-plate removed, and Fig. 4 is a bottom view of the said plate removed from the casing.

It will be understood by those skilled in the art that a flask of any ordinary or approved form is to be used in connection with my improvements, and preferably a flask such as that shown in the drawings of my patent above referred to, having a chill-plate and other necessary appurtenances, which I deem unnecessary to illustrate in the present case.

Referring by letter to the said drawings, A indicates a cylindrical casing, which is of suitable length and of a diameter to correspond with the internal diameter of the sand mold within a flask. This casing is preferably hollow, and has a central vertical aperture, a, for the passage of a vertical shaft, B, carrying at its upper end a handle for the grasp of the operator, and having its lower end secured from vertical displacement by a nut on the under side of the bottom plate.
C indicates a disk, which is rigidly secured to the lower end of this vertical shaft and within the casing. At diametrical opposite points the lower edge of the cylindrical wall of the casing A is cut away, as shown at b b, for the reception of the pivoted blocks or bead-formers D. It will be observed that one of the walls of these cut-away portions or recesses is circularly beveled, as shown at d, and the opposite walls are cut obliquely, as shown at e.

E indicates the movable blocks for forming the beads. These blocks are beveled on their outer sides, so as to make the impression desired in the sand molds, and they have an inward offset, as f, for a purpose which will be presently explained. The blocks or bead-formers are rounded at one end, as at g, and are pivoted at such points to the casing, so that the said rounded portions will move in the curved portions d. The opposite ends of these blocks are cut obliquely and the inner sides of these ends terminate in lugs h, which engage the inner side of the cylindrical wall of the casing and limit the outward throw of the said blocks. The free ends of the blocks at their offsets are connected with the disk on the operating-shaft by means of links T, which are pivoted to the said disk eccentrically, so that when the shaft has been turned in one direction the blocks will be quickly protruded at diametrically-opposite points from the recesses in the cylindrical casing, and when turned in the opposite direction the blocks will be retracted. It is obvious that a crank or other suitable power may be employed for turning the shaft for the purpose of moving the bead-forming blocks.

F indicates a plate for closing the open bottom of the cylindrical casing. This plate is of a form substantially as shown in Fig. 4 of the drawings, having transverse holes in its margin for the passage of screws or other securing devices. This plate is provided on its under side with semicircular depending flanges, as shown, and its edge or periphery is cut away at opposite points, as shown at i i, for the purpose of allowing the movable blocks to be retracted flush with the periphery of the casing.

When the device has been lowered into the sand mold in the flask and rested upon the chill-plate and the shaft centered, the molder turns the vertical shaft in the proper direction, which operation first protrudes the pivoted blocks beyond the periphery of the casing. A further rotation of the shaft is then made, which will move the casing and blocks around, and will press the blocks into the sand and compress the sand, thus forming the annular female bead. The shaft is then turned in an opposite direction, which will cause the pivoted blocks to be retracted and allow the device to be withdrawn from the mold, when the core may be introduced and the metal which forms the pipe poured.

Instead of forming this device separate from the pattern, I may make it a fixed part of the pattern, in which case the construction of the parts named would remain substantially the same. The only difference is, that the casing would be fixed to the lower end of the pattern and the shaft would pass up through the pattern. It is obvious that when the pattern had been placed in position the blocks could be protruded and withdrawn by the means above described without impairing the usefulness of the other parts. The edges of the bottom plate are chamfered at their recesses or cut-away portions, so as to afford but little surface for the retention of sand or other matter back of the bead-formers.

Having described this invention, what I claim is—

1. A device for forming female beads in sand molds, consisting of an apertured casing, an operating-shaft passing through the same, and bead-forming blocks pivoted at one end within the casing and having their opposite ends connected with the shaft by links, substantially as specified.

2. The combination, in a bead-molding device, of the recessed and chamfered bottom plate, the female bead-formers vibrated by attached links about fixed pivots in their extremities, the disk with pivotal pins for attachment of links, the links connecting the vibrating female bead-formers and the disk, the shaft keyed to the disk, and the cylindrical cap or casing, substantially as specified.

In testimony whereof I affix my signature in presence of two witnesses.

CALEB B. ISBESTER.

Witnesses:
E. B. THOMASSON,
M. LLEWELLYN.